C. E. HIATT.
MEANS FOR MEASURING THE FREQUENCY OF AN ALTERNATING CURRENT.
APPLICATION FILED FEB. 21, 1911.
1,121,626. Patented Dec. 22, 1914.
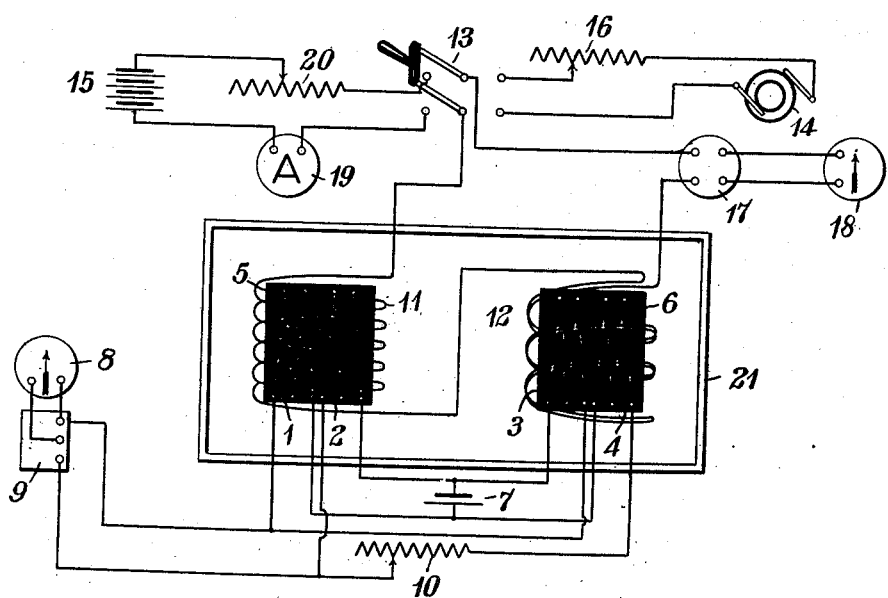

UNITED STATES PATENT OFFICE.

CASSIUS E. HIATT, OF EAST ORANGE, NEW JERSEY, ASSIGNOR TO WESTINGHOUSE ELECTRIC & MANUFACTURING COMPANY, A CORPORATION OF PENNSYLVANIA.

MEANS FOR MEASURING THE FREQUENCY OF AN ALTERNATING CURRENT.

1,121,626.  Specification of Letters Patent.  Patented Dec. 22, 1914.

Application filed February 21, 1911. Serial No. 610,100.

*To all whom it may concern:*

Be it known that I, CASSIUS E. HIATT, a citizen of the United States, and a resident of East Orange, in the county of Essex and State of New Jersey, have invented a new and useful Improvement in Means for Measuring the Frequency of an Alternating Current, of which the following is a specification.

My invention relates to electrical measuring instruments and particularly to such instruments as are employed for measuring the frequencies of alternating currents.

The object of my invention is to provide a method of, and apparatus for, determining, with a very high degree of accuracy, the frequencies of alternating currents and which shall be adapted to measure frequencies ranging from only a few cycles to hundreds of thousands per second.

The single figure of the accompanying drawing diagrammatically illustrates apparatus embodying and for practising my invention, which apparatus comprises a Wheatstone bridge each of the arms 1—2—3—4 of which is composed of very fine iron wire that is wound or coiled upon suitable supports, the opposite arms 1 and 2 of the bridge being preferably placed upon a support 5 and the other pair of opposite arms 3 and 4 being preferably placed upon another support 6. The supports 5 and 6 may be, and suitably are, composed of mica, though they may be of any other suitable character, and the wires composing the arms of the Wheatstone bridge are applied thereto in zig-zag form so that adjacent portions thereof are separated and insulated from each other. The iron wires composing the arms of the bridge are of very small diameter in order that no eddy currents shall be produced therein when magnetized, and also in order that they may have very low terminal capacities whereby the sensitiveness of the apparatus is increased.

A battery 7 is connected between the junction of the arms 2 and 3 and the junction of the arms 1 and 4 of the bridge, and a mirror galvanometer 8 is connected between the remaining two junctions of the arms of the bridge, with a suitable shunt box 9 properly related thereto. A resistance 10 is also included in the arm 4 of the bridge for the purpose of permitting initial balancing of the bridge.

The arms 1 and 2 of the Wheatstone bridge are surrounded by a solenoid 11 comprising a suitable number of convolutions of wire which are wound inductively, and the arms 3 and 4 of the bridge are surrounded by another solenoid 12 comprising the same number of convolutions of wire as the solenoid 11 and in all respects like it, except that it is wound non-inductively. The coils 11 and 12 may be connected, by means of a double-throw switch 13, either to a source 14 of alternating current or to a source 15 of direct current, the alternating current, of course, being that of which it is desired to measure the frequency. When the coils 11 and 12 are connected to the source of alternating current, the amount of current traversing the same may be regulated by means of a rheostat 16, and the said current is thereby preferably maintained constant during the making of a measurement.

In order that the amount of current traversing the solenoids may be definitely known, as an assistance to maintaining it constant, suitable means for measuring the same may be included in the circuit therewith, such, for instance, as a thermo-ammeter 17 which is used in conjunction with a galvanometer 18, in a manner set forth in a co-pending application Serial No. 522,515, filed by me on Oct. 14, 1909, though any other suitable means may be employed instead thereof. The coils 11 and 12 are adapted to be connected to a source of direct current for the purpose of establishing substantially steady and uniform temperature conditions in preparation for a test, thereby eliminating possible thermo-electric disturbances due to sudden heating of the coils and bridge arms when measurements are taken. Direct current may also be used for purposes of calibration, in which connection an ammeter 19 and a resistance 20 will be found useful. In order that the solenoids 11 and 12 and the bridge arms may not be affected by external temperature conditions, they are preferably inclosed in a suitable heat-insulating casing 21.

In making use of the device, a balance of the Wheatstone bridge is first secured. The alternating current, the frequency of which it is desired to measure, is then passed through the solenoids 11 and 12 and maintained, as nearly as possible, constant in value. The arms 1 and 2 of the bridge then become magnetized by the solenoid 11, which is inductively wound, and are accordingly heated by the hysteresis that is produced by the alternations of the flux therein, the degree of heating, of course, being directly proportional to the frequency of alternations of the flux and the energizing current since eddy currents are eliminated by reason of the fineness of the wire constituting the said arms. The arms 1 and 2 will also be heated to a certain degree by the rheostatic or $I^2R$ losses due to the current traversing the solenoid 11, and, in order that this heating effect may be neutralized and only the hysteretic heating effect of the energizing alternating current may be permitted to effect unbalancing of the bridge, the arms 3 and 4 thereof are surrounded by the solenoid 12 which is exactly like the solenoid 11 except that it is non-inductively wound. The only heating effect, therefore, to which the arms 3 and 4 are subjected is a rheostatic or $I^2R$ effect which is exactly like the corresponding effect to which the arms 1 and 2 are subjected by the solenoid 11. The degree of unbalancing of the Wheatstone bridge is then due only to the hysteretic heating effect of the energizing alternating current upon the arms 1 and 2, which heating effect is directly proportional to the frequency of alternations of the energizing current and may be measured by means of the galvanometer 8.

The apparatus is highly sensitive and permits of a determination of the frequency of the alternations of a current with great accuracy. The apparatus may also be utilized for measuring frequencies differing widely in value, such as from 10 to $10^6$ cycles per second, but it is particularly useful for the measurement of very high frequencies which other instruments are not adapted to measure.

In adapting the apparatus for the measurement of comparatively low frequencies, the Wheatstone bridge may be balanced with direct current traversing the solenoids 11 and 12, but, in order to adapt it to measure extremely high frequencies, it will usually be found desirable to secure a balance of the bridge with alternating current transversing the solenoids 11 and 12 the frequency of which is less than that which is to be measured.

I claim as my invention:

1. A frequency meter comprising a Wheatstone bridge the arms of which are formed of fine iron wire, an inductively wound coil surrounding two opposite arms of the Wheatstone bridge, and a similar non-inductively wound coil surrounding the other two opposite arms of the said bridge.

2. A frequency meter comprising a Wheatstone bridge the arms of which are formed of fine iron wire, an inductively wound coil surrounding two opposite arms of the Wheatstone bridge, and a similar non-inductively wound coil surrounding the other two opposite arms of the said bridge and connected in series with the aforesaid coil.

3. A frequency meter comprising a Wheatstone bridge the arms of which are formed of fine iron wire, an inductively wound coil surrounding two opposite arms of the Wheatstone bridge, a similar non-inductively wound coil surrounding the other two opposite arms of the said bridge and connected in series with the aforesaid coil, and means for maintaining the current that traverses the said coils substantially constant.

4. A frequency meter comprising a Wheatstone bridge the arms of which are formed of fine iron wire, an inductively wound coil surrounding two opposite arms of the Wheatstone bridge, a similar non-inductively wound coil surrounding the other two opposite arms of the said bridge, and means for measuring any unbalancing of the resistances respectively of the inductively and non-inductively surrounded legs of the Wheatstone bridge.

5. A frequency meter comprising a Wheatstone bridge the arms of which are formed of fine iron wire, an inductively wound coil surrounding two opposite arms of the Wheatstone bridge, and a similar non-inductively wound coil surrounding the other two opposite arms of the said bridge, and a heat-insulating casing surrounding the said bridge and coils.

In testimony whereof, I have hereunto subscribed my name this tenth day of February, 1911.

CASSIUS E. HIATT.

Witnesses:
GEORGE P. SCHOLL,
A. YOUNGHOLM.